United States Patent [19]

Kass

[11] 4,182,098

[45] Jan. 8, 1980

[54] APPARATUS AND METHOD FOR HARVESTING AND WINDROWING CORN

[76] Inventor: Kenneth J. Kass, Rte. 2, Box 156, Tracy, Minn. 56175

[21] Appl. No.: 805,276

[22] Filed: Jun. 10, 1977

[51] Int. Cl.$^2$ .................... A01D 45/02; A01D 57/00; A01D 55/24
[52] U.S. Cl. ..................................... 56/14.5; 56/154; 56/192; 56/291
[58] Field of Search ...................... 56/13.5, 14.3, 14.4, 56/14.5, 14.1, 14.2, 93, 106, 110, 290–292, 153, 154, 192, 295

[56] References Cited

U.S. PATENT DOCUMENTS

| B 494,167 | 3/1976 | Comer | 56/295 |
|---|---|---|---|
| 982,798 | 1/1911 | Corderman | 56/106 |
| 1,280,223 | 10/1912 | Higgins | 56/290 |
| 2,509,371 | 5/1950 | Schroeppel | 56/14.4 |
| 2,677,225 | 5/1954 | Ommodt | 56/14.4 |
| 3,106,053 | 10/1963 | Faurbairn | 56/291 |
| 3,208,206 | 9/1965 | Lundell | 56/153 |
| 3,400,524 | 9/1968 | Segredo | 56/98 |
| 3,599,404 | 8/1971 | Fernandez et al. | 56/98 |
| 3,680,291 | 8/1972 | Soteropulos | 56/14.6 |
| 3,885,375 | 5/1975 | Solterbeck | 56/106 |
| 4,083,167 | 4/1978 | Lindblom et al. | 56/98 |

Primary Examiner—Russell R. Kinsey
Assistant Examiner—Paul J. Hirsch
Attorney, Agent, or Firm—Williamson, Bains, Moore & Hansen

[57] ABSTRACT

An apparatus for harvesting and windrowing of corn utilizes one or more conveyor units swingably mounted to a corn harvesting implement such as a combine or corn picker and has horizontally moving cutting means carried forwardly of the conveyor units. As the implement moves through a field of standing corn, the cutting means severs the cornstalks as harvesting heads on the implement engage the stalk and strip the corn ears from the stalk. The conveyors receive and transport the severed stalks to a cornstalk discharge location between the conveyor units to create a cornstalk windrow along the path of the traveling implement. Corn plant residue, such as leaves, kernels, ear husks and the like, resulting from husking, are discharged from the implement and guided by deflector plates onto the windrow to be retained there for curing and later pickup. A set of horizontally moving knives having upright pushers are carried by an endless moving chain to sever the stalks between converging knives and to urge the stalks toward the windrow. A method of harvesting standing corn by the utilizing of a windrow is also disclosed.

25 Claims, 11 Drawing Figures

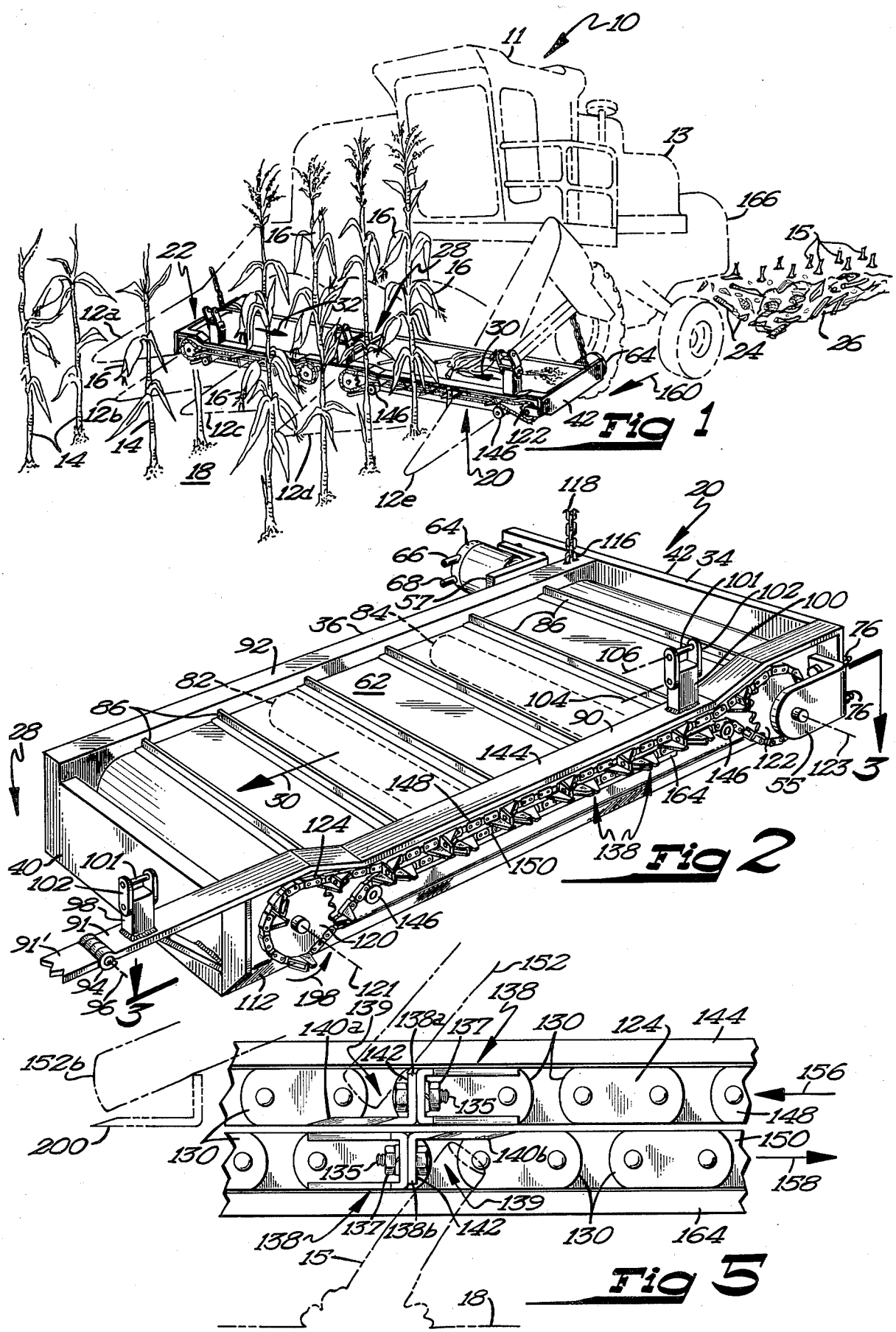

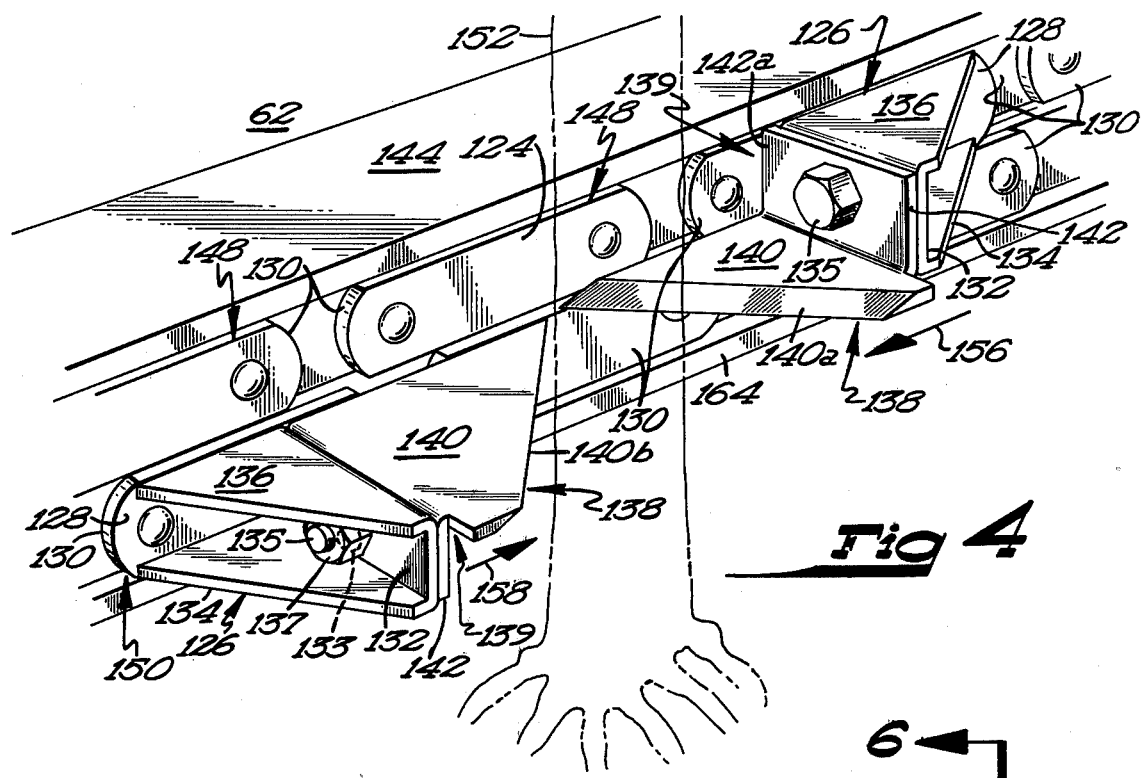
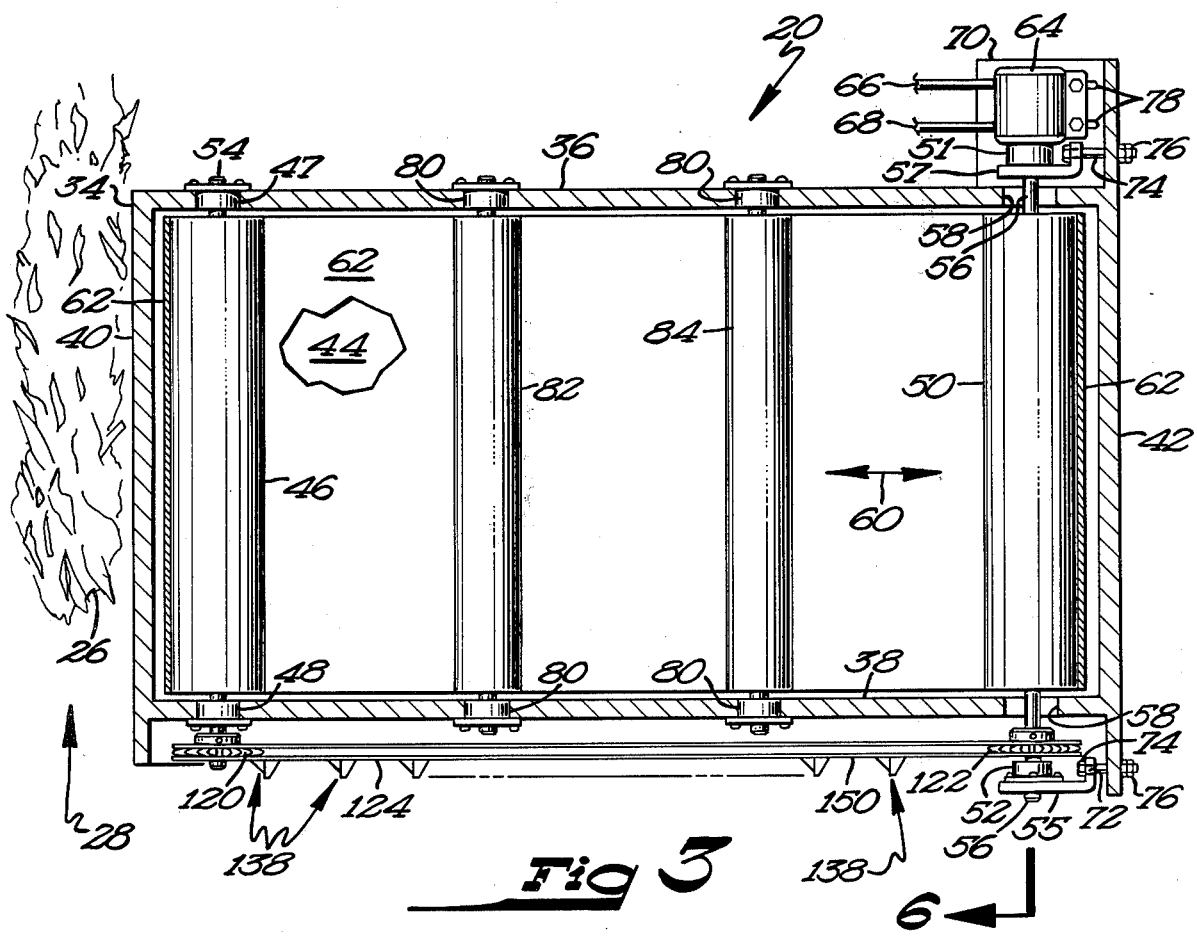

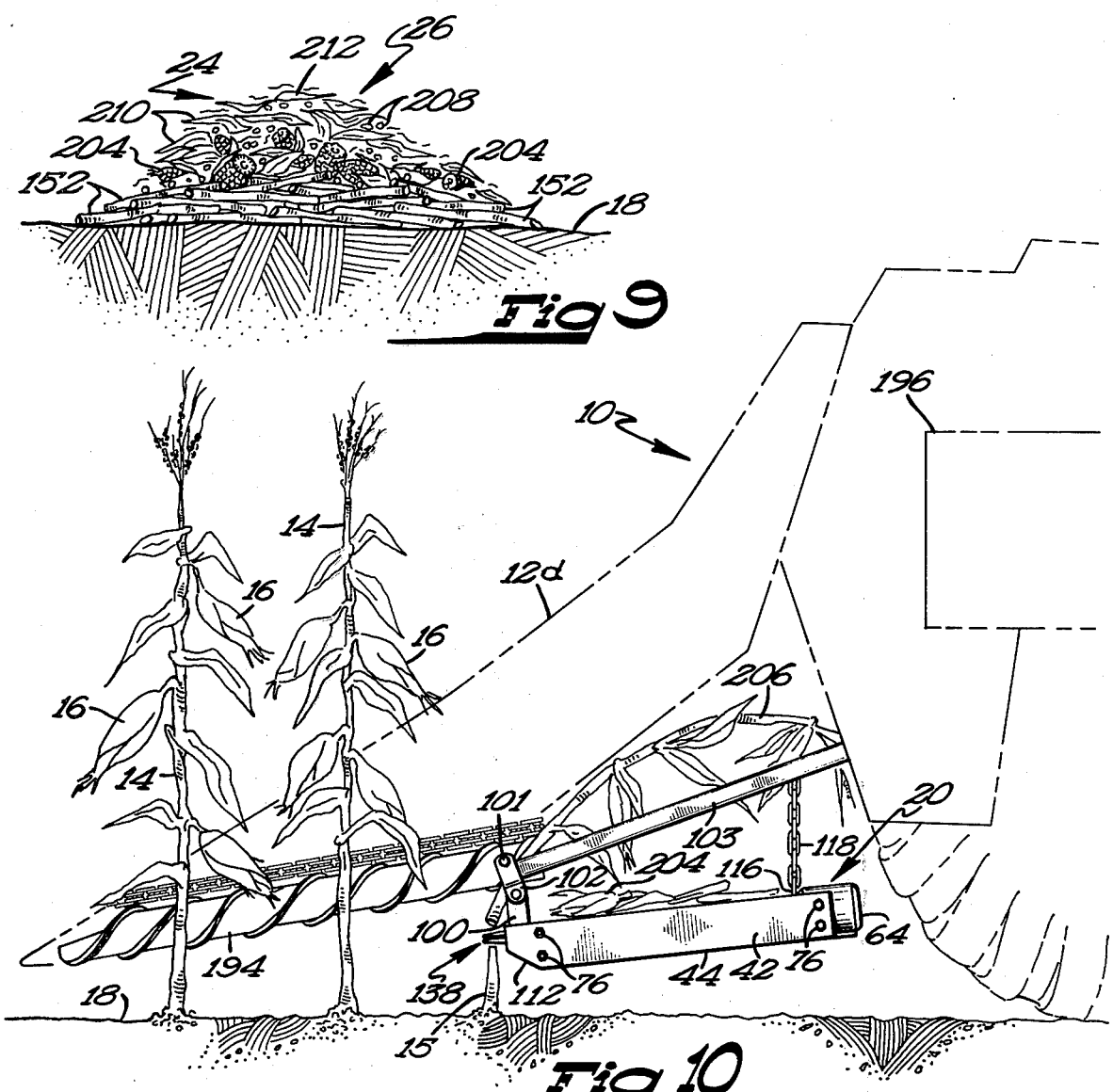
Fig 9
Fig 10
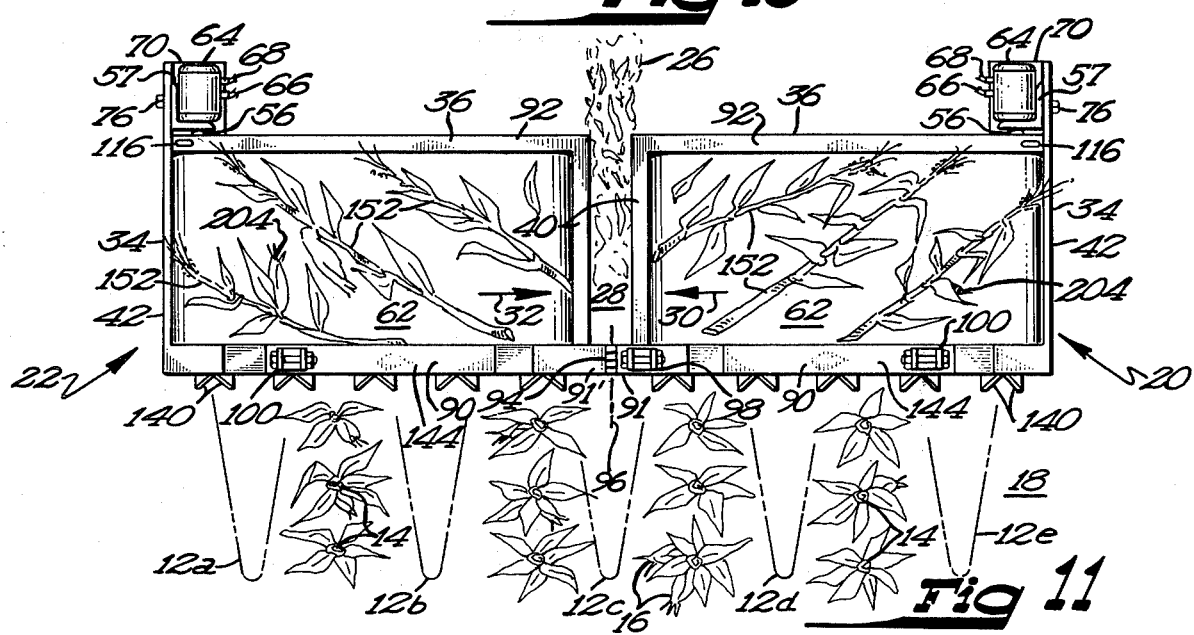
Fig 11

APPARATUS AND METHOD FOR HARVESTING AND WINDROWING CORN

BACKGROUND OF THE INVENTION

The invention relates to the field of harvesting corn and comprises a method and apparatus by which standing corn can be picked, husked, and the resulting corn plant residue, such as kernels, husks, leaves and the like, deposited on a windrow along the path of the implement for curing and later pickup.

Modern corn harvesting is frequently done in two stages with a combine or corn picker having corn heads adapted for multi-row operation performing the first stage of picking the ears from the corn while leaving the enrooted cornstalks standing. The second stage occurs later when a chopper moves through the field and cuts down the standing cornstalks and collects them for use as silage.

Typically, the first stage, during which the ears are picked from the stalk, is accomplished by combines or corn pickers utilizing snapping rollers or chains to engage the cornstalk and strip the ears therefrom while leaving the stalk standing in the field. Generally, the implement also husks the corn and retains the husked ears while discharging the corn plant residue resulting from husking from the implement and into a trailing bin or adjacent truck. The corn plant residue typically contains leaves, husks, dislodged corn kernels and the like and has exceptionally high nutritional value and is greatly desired as livestock feed. A serious disadvantage of the existing procedure is that the highly nutritious corn plant residue is collected at the time of harvesting of the ears and contains a high moisture level. This high moisture level makes the residue vulnerable to mildew and fungus induced spoilage and more difficult to store. If long term storage is contemplated, it is necessary that the residue be dried in grain dryers or the like with expenditure of substantial energy. Accordingly, a serious shortcoming of the present harvesting apparatuses is that the valuable corn plant residue is collected at the time of harvesting and with its high moisture content is difficult to store and expensive to artificially dry.

Another shortcoming of the existing apparatuses is that the standing cornstalks are cut as a second, distinct operation during which a chopper moves through the field to cut the stalks and collect them. Typically, such choppers utilize rapidly spinning blades which hack the cornstalk in two and simultaneously generate clouds of dust and sometimes even uproot the cornstalks, gathering further dirt clods, roots, clinging dirt, and the like and mixing such impurities with the gathered stalks. Such dirt ingredients are abrasive to the teeth of livestock and make the silage less acceptable for feeding purposes. At times, the cornstalks gathered by the chopper may also contain excessive moisture levels and, after grinding, may require drying for long-term storage.

Another shortcoming of the known apparatuses is that with the separate harvesting of cornstalks and the separate collection of corn plant residue, both of these key livestock feeds are acquired separately when, in view of their common purpose, it would be more desirable that they be collected simultaneously.

Still another shortcoming of the existing apparatuses is that the corn plant residue, which is typically delivered to the trailing bin or truck by a discharge aperture or chute is that many of the smaller, but very nutritious, elements of the residue can be blown off by wind and may never reach the truck or bin.

The invention disclosed herein provides a solution to these shortcomings.

SUMMARY OF THE INVENTION

The invention is usable with a corn harvesting implement, such as a corn picker or corn harvesting combine, for the picking and husking of corn ears, the cutting of the upright cornstalks, the creating of a windrow along the path of travel of the implement and the depositing of the corn plant residue resulting from husking on the windrow for curing and later collection.

A cornstalk collecting means, such as a conveyor unit or pair of units, and also a cornstalk cutting means are mounted to a corn harvesting implement so as to cut standing cornstalks while the stalks are gripped by the corn harvesting heads of the combine or picker. As the severed stalks collapse, an underlying conveyor unit receives them and moves them laterally to a stalk discharge location at an end of the conveyor for creation of a windrow. The residue of corn kernels, husks, leaves and the like which inevitably result from husking are discharged from the implement directly onto the windrow where they are retained, immeshed in and supported by the matrix of cornstalks and gradually cure in the field, thereby eliminating the need for a separate drying operation. Guidemeans in the form of deflector plates or the like are attached to the discharge aperture of the combine or corn picker so as to guide the corn plant residue downwardly onto the windrow without loss of the residue to one side or the other of the windrow due to surface wind.

The conveyor unit or units are swingably mounted to the implement to swing from a rest position to a displaced position located rearwardly and above the rest position in the event that uneven ground conditions are encountered by the conveyor, thereby protecting the conveyor from collision with rocks, mounds of earth, and the like. The forward, leading edge of the conveyor has a ramp along its front edge which extends rearwardly, downwardly from the front of the conveyor so as to strike any rising ground to thereby slide along the ground and urge the conveyor rearwardly, upwardly to the displaced position.

Cornstalk cutting means are provided anterior to each conveyor unit and may comprise an endless chain oriented in a generally upright plane and carrying a plurality of spaced-apart, horizontally oriented knives. The chain has upper and lower closely-spaced, generally parallel horizontal chain runs so that knives fixed to the upper and lower runs will converge horizontally on one another and cooperate to cut standing cornstalks therebetween. Upright pushers are carried by the chain and extend forwardly from the conveyor unit to strike the severed cornstalks immediately after cutting and to urge them toward the windrow. If desired, the knives and pushers may be an integral unit and carried either by an endless chain or mounted directly to the leading edge of the moving conveyor belt.

Accordingly, the invention eliminates many past problems associated with separate cutting of standing cornstalks and the picking and husking of corn by providing a new method and apparatus for harvesting whereby the stalks are cut during the same operation in which the ears are picked and husked. The normally highly moist corn plant residue, resulting from husking, is deposited on the windrow of stalks for curing. Little dirt or dust is mixed with the windrow because the cutting means, with its endless chain does not disturb the soil and does not generate dust or dirt as has been the case with many choppers. When the windrow is collected after curing has occurred, all elements of the livestock feed are together in the windrow for simultaneous grinding and the feed elements are relatively clean, cured by sun and air, and ready for storage.

The advantages and novel features which characterize the invention are set out with particularity in the claims attached hereto and forming a part of this description. For a full understanding of the invention and the objects and advantages obtained through its use, reference should be made to the drawings which form a further part hereof and to the accompanying description in which is illustrated and described the preferred embodiments of the invention.

BRIEF DESCRIPTION OF THE DRAWINGS

FIG. 1 is a front perspective view, partially in phantom, showing an embodiment of the invention harvesting standing cornstalks and creating a windrow.

FIG. 2 is a perspective drawing of a conveyor unit shown in FIG. 1 and usable with the invention.

FIG. 3 is a top cross sectional elevation view of the conveyor unit of FIG. 2 taken in the direction of arrows 3—3 of FIG. 2.

FIG. 4 is a front perspective view of a portion of a cutting means used with the invention showing the converging action of cutting knives in severing standing cornstalks.

FIG. 5 is a front elevation view of the cutting means of FIG. 4 showing successive positions of the moving knives and their use in striking and moving severed cornstalks in a lateral direction.

FIG. 9 is a cross sectional view of a windrow formed in accord with the invention and showing corn plant residue supported thereon.

FIG. 10 is a side elevation view taken in cross section through the corn harvesting heads of the implement of FIG. 1 showing the picking of the corn, cutting of the cornstalks and collection of the stalk in accord with the invention.

FIG. 11 is a top elevation view of the pair of conveyor units shown in FIG. 1 showing the collecting of cornstalks and creating of a windrow in accord with the invention.

DESCRIPTION OF THE PREFERRED EMBODIMENTS

Figure 6:
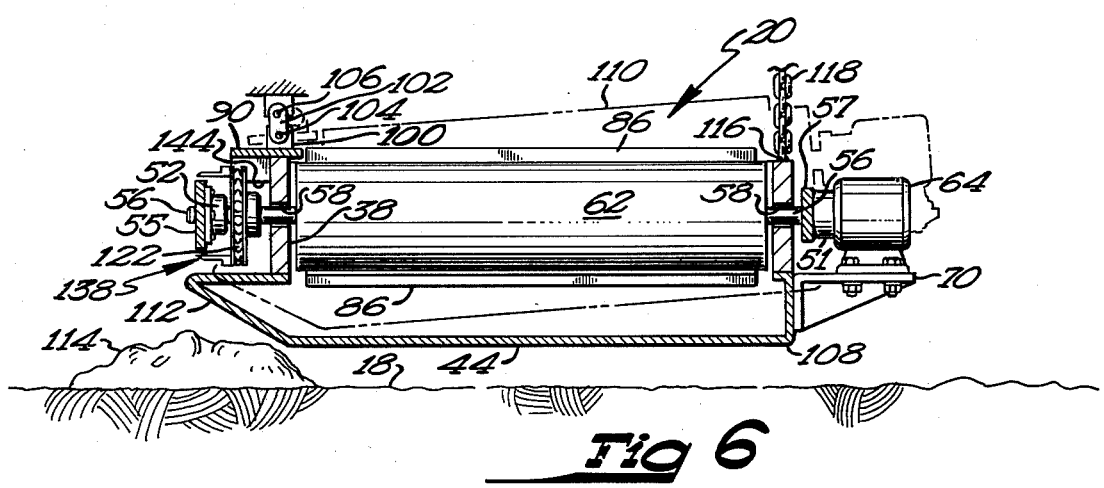
FIG. 6 is an end view of a conveyor unit used with the invention and showing alternative positions of the conveyor unit.

Referring now to FIG. 1, a corn harvesting implement 10 having its own power source 13, such as a multirowed, self-propelled corn picker or a corn harvesting combine having laterally arranged, spaced-apart corn heads 12a–12e is shown moving through a corn field for harvesting of standing cornstalks 14 which have attached ears 16 and are enrooted in the ground 18.

While the corn harvesting implement 10 shown in FIG. 1 is representative of a self-propelled corn harvesting combine, it should be understood that any corn harvesting implement, whether or not self-propelled, adapted for picking of the ears from the stalks and the husking of the ears can be used with the invention and is within its purview. In addition, while the shown implement 10 is provided with five corn heads 12a–12e for four row operation, it should be understood that a greater or lesser number of corn heads may be used with the invention and the number of corn heads selected is determined by the size of the crop to be harvested and the invention is adaptable to and usable with any number of corn harvesting heads.

The term "corn harvesting heads", as used herein is intended to include any agricultural attachment which provides a corn ear picking means by which standing cornstalks are engaged and by which corn ears are removed from the stalk. A variety of different mechanical mechanisms may be employed for removal of the ears from the stalk, and most any such mechanism may be used with the invention.

During harvesting, the standing cornstalks 14 are received between and engaged by adjacent corn harvesting heads, such as 12d and 12e and the upright stalks are gripped by snapping rollers 194 (FIG. 10) which remove or pick the corn ears 16 and leave the stalk stubs 15 standing in the field. During picking of the ears, numerous corn leaves and husks become detached or broken by the rollers 194 and, with prior art devices, were dropped along the path of the implement and never recovered. The present invention utilizes one or more conveyor units, such as units 20 and 22 which are positioned below the corn harvesting heads and receive most leaves, husks, and the like which drop from the snapping rollers.

After the corn ears 16 have been removed from the stalk, the implement 10 utilizes husking means to remove the husks from the ears and separates the husks from the husked ears, retaining the ears and discharging the corn plant residue 24 resulting from husking onto a trailing windrow 26. Typically, the residue 24 will contain husks, leaves, bits of attached stalk, corn kernels which have been dislodged from the cob during husking, and the like. These various corn elements form highly desirable and nutritious feed elements for livestock and it is desirable that they be recovered.

It should be understood that the corn harvesting implement 10 and the shown corn harvesting heads 12a–12e are well known to the agricultural art and accordingly, will not be discussed in great detail in this disclosure and that attention herein will be directed to the new elements of the apparatus and method by which corn harvesting may be accomplished.

Referring now to FIGS. 1 and 2, horizontal conveyor units 20 and 22 are substantially identical in purpose and operation and differ in that the conveyor 20 is arranged for operation on one side of the implement 10 and the conveyor 22 on the other side, both conveyors being positioned below the harvesting heads 12a–12e, extending laterally outwardly from the implement 10 transversely to the path of the implement, and being constructed and arranged to move material horizontally thereon toward a stalk discharge location at central gap 28 located therebetween so as to create the windrow 26. Accordingly, the conveyor 20 has its conveyor belt moving in direction 30 and the conveyor 22 has its belt moving in direction 32.

Because of the substantial similarities in structure between conveyor units 20 and 22, only conveyor unit 20 will be described in detail. Referring now to FIGS. 2, 3 and 6, the conveyor unit 20 has a rigid, generally rectangular metal frame 34 which includes rear plate 36, front plate 38, end plates 40 and 42 and bottom plate 44, all being attached by any means known to the art, such as by welding, bolting, or the like.

At the inner end of the frame 34, an elongated, terminal roller 46 has its central longitudinal shaft 54 rotatably journaled in bearings 47 and 48, and a second terminal roller 50 has its shaft 56 rotatably journaled at the outer end of the frame 34 in bearings 51 and 52 which are carried on movable adjusting plates 57 and 55, respectively, permitting the tension of conveyor belt 62 to be varied. The terminal roller 50 has its central shaft 56 extending through oversized apertures 58 in the frame 34 permitting the shaft to be moved in directions 60 toward and away from end plate 42 so as to adjust conveyor belt tension as the adjusting plates 55 and 57 are moved toward or away from the end plate 42.

The central shaft 56 is coupled by any known means to a hydraulic motor 64 having inlet and outlet hoses 66 and 68, the motor 64 being slidably carried on a motor mounting bracket 70 by bolts or any other means known to the art.

The substantially identical adjusting plates 55 and 57, which support opposed ends of the shaft 56, have apertures 72 through which bolts 74 extend through the end plate 42 so as to be received in nuts 76. Accordingly, by tightening or loosening of the nuts 76 on bolts 74, the adjusting plates 55 and 57 may be moved toward or away from the end plate 42 to adjust the tension of the conveyor belt 62 or the endless chain carried on shaft 56 to be described further hereafter.

As the adjusting plates move toward and away from the endplate 42, the hydraulic motor 64 moves therewith, the bolts extending between the motor 64 and motor mounting bracket 70 being first loosened so as to slide freely along elongated slots 78 of the motor bracket 70. While the conveyor unit 20 is shown as being driven by a hydraulic motor 64, it should be understood that any type of motor or driving means known to the art may be substituted therefor and used with the invention. The hydraulic motor 64 has been selected because many harvesting implements have a hydraulic system power source to which such a motor can be connected and from which it can be energized. It is contemplated that the hydraulic motor 64 through its inlet and outlet hoses 66 and 68 will be connected to a hydraulic power source of a combine or corn picker and energized therefrom. While such a hydraulic power source is contemplated, again, it should be understood that other power supplies, such as mechanical or electric supplies may be substituted with other appropriate drive means replacing the motors 64.

It is desirable that the motor 64 be mounted on the rear, outer corner of the frame 34 to protect it from obstacles encountered by the front 38 of the frame and to keep it clear of the windrow 26 forming in and around gap 28 between the conveyor units.

Rotatably mounted in bearings 80 and located between the terminal rollers 46 and 50 are idler rollers 82 and 84 which provide intermediate support to the upper surface of the conveyor belt 62.

Mounted for movement with the rollers 46, 50, 82 and 84 is an endless conveyor belt 62 formed of rubber, canvas or other material known to the art and usable as a conveyor belt surface. The belt 62 has a plurality of preferably parallel, raised, spaced-apart stalk engaging protrusions 86 positioned therealong to engage cornstalks and move them with the belt in the direction 30 toward gap 28.

Fixed to the frame 34 at the top thereof are forward and trailing top plates 90 and 92, respectively, which overlie the edges of belt 62 slightly. The forward top plate 90 has an extension 91 extending longitudinally from the conveyor and is fitted with a hinge 94 which is connected with the extension 91' of the forward top plate of the conveyor unit 22, pivotally connecting the units 20 and 22 and permitting them to swing relative to one another about a generally horizontal axis 96.

Fixed to the forward top plate 90 and spaced from one another are upright attachment linkages 98 and 100 which attach to a frame bar 103 of the implement 10 and each of which has a swinging link 102 which permits swinging pivoting movement of the conveyor units 20 and 22 about axes 104 and 106, allowing the conveyor unit 20 or 22 to swing relative to the implement 10 from a rest position 108 to an elevated displaced position 110, as best shown in FIG. 6.

The bottom plate 44 of the conveyor units 20 and 22 is provided with a ramp 112 where it joins the front plate 38, the ramp 112 angling rearwardly and downwardly from the front plate 38 to assist in swinging the conveyor unit 20 from the rest position 108 to the displaced position 110 when the ramp encounters a rock 114 or other surface irregularity, as best shown in FIG. 6.

Fixed to the rear or trailing top plate 92 of each conveyor unit is an eye 116, from which a chain 118 extends upwardly for attachment to the frame of the combine. By appropriate adjustment of the length of the chain 118, the conveyor units 20 and 22 may be leveled or angled slightly relative to the ground, depending upon the ground operating conditions to be encountered.

Accordingly, the conveyor 20 comprises a corn stalk windrow defining means which is mounted below the harvesting heads to collect severed stalks as they are released by the snapping rollers 194 and which directs severed stalks to a predetermined stalk discharge location in gap 28 to define the windrow 26. Naturally, the windrow defining means may include a single conveyor unit 20, a pair of units as 20 and 22, or additional conveyor units.

Referring now to FIGS. 2 and 3, sprockets 120 and 122 are fixed to the forward ends of shafts 54 and 56, respectively, for rotation therewith about axes 121 and 123, respectively, and an endless chain 124 is drivingly immeshed by the sprockets 120 and 122 and oriented in a generally upright plane. The chain is further supported by a pair of idlers 146 which angle the chain upward from the sprockets and define a generally straight lower chain run 150 extending between idlers 146. An upper chain run 148 extends parallel to and is closely spaced from lower chain run 150, the forward top plate 90 dropping downwardly at 144 to guide the chain therealong and define the generally straight run 148. A chain guide flange 164 is located below lower run 150, is fixed to the plate 38 and generally parallel to the segment 148 to contain the runs 148 and 150 between flange 164 and segment 148 in order to keep the blades 140 of the upper and lower chain runs closely adjacent so as to cut the stalks therebetween.

Positioned at regular intervals along the links 130 of chain 124 are outwardly extending knife mounting brackets 126, best shown in FIG. 4. Each bracket 126 has a chain mounting plate 128 which is rigidly fixed to a chain link 130 by rivets or other means known to the art. Each mounting bracket 126 includes a web 132 extending forwardly outwardly from the plate 128 at right angles thereto and to the plane of the chain 124 and is reinforced by parallel, rigid ears 134 and 136 which extend between the web 132 and chain mounting plate 128. The web 132 has a bolt aperture 133 therethrough by which an integral knife and cornstalk pusher unit 138 may be attached to the web as will be described further hereafter.

Fixed to each of the knife mounting brackets 126 is an integral knife and cornstalk moving pusher unit 138. The integral unit 138 comprises a generally horizontally oriented triangular, sharpened knife blade 140 and an upright rectangular, stalk pusher 142, the blade and pusher having an integral generally L-shaped cross section with the blade 140 comprising the base of the L and extending horizontally when in cutting operation and the pusher or stalk moving unit comprising the vertical leg of the L.

Accordingly, each of the knife mounting brackets 126 carries an integral knife and pusher unit 138 bolted thereto, and preferably these units are positioned approximately nine inches apart along the chain 124 for movement with the chain.

As best seen in FIG. 4, the integral knife and stalk pusher units 138 extend forwardly outwardly from the chain 124 so as to engage and sever a cornstalk 152 therebetween with the knife blades striking and severing the stalk from opposed directions 156 and 158 with each knife 140a of the upper chain run moving in direction 156 while each knife 140b of the lower chain run moves in opposite direction 158.

The upper knife 140a moves in direction 156 toward the gap 28 at the inner end of the conveyor 20 or 22 so that the upper knife 140a will strike the cornstalk 152 and start it moving toward the gap 28 where the windrow 26 is formed.

As the knife blades 140a and 140b pass through the cornstalk 152 (FIG. 4), the upright stalk pushers 142 strike the stalk above and below the cut and in the event any fibrous material remains to connect the stalk with the stub 15, the pushers will complete the severing. The blade 140, pusher 142 and the rearward chain links 130 immediately behind and perpendicular to the surfaces 140 and 142 define an enclosure 139 which recives and engages the severed stalk and carries it toward the gap 28 as shown in FIG. 5. The pushers 142a of the upper chain run engage the severed stalk and move it in the direction 156 toward the gap 28 to assure that the stalk drops on the conveyor belt so as to have a diagonal orientation on the belt, as best shown in FIG. 11. This orientation assures that most of the length of the stalk 152 will be supported on the conveyor unit 20 or 22 and reduces the loss of cornstalk material.

The conveyor units 20 and 22 are positioned below the snapping rollers 194 such that the rollers are still engaging and gripping each cornstalk 152 as the units 138 sever the stalk. The rollers 194 thus retain each stalk and keep it rigidly upright during cutting, thus cooperating with the units 138 to more effectively cut the stalks. After cutting the stalks the forward movement of implement 10 causes the stalks to drop clear of the rollers 194 onto the conveyor units 20 and 22.

Accordingly, the rotatably mounted sprockets 120 and 122, the idlers 146, the endless chain 124 and the attached knife mounting brackets 126, along with the plurality of integral knife and pusher units 138 comprise one type of cornstalk cutting means coupled with the conveyor unit and energizethe power source of the implement 10 for severing cornstalks and for striking and moving the cornstalks toward the central gap 28.

Figure 7:
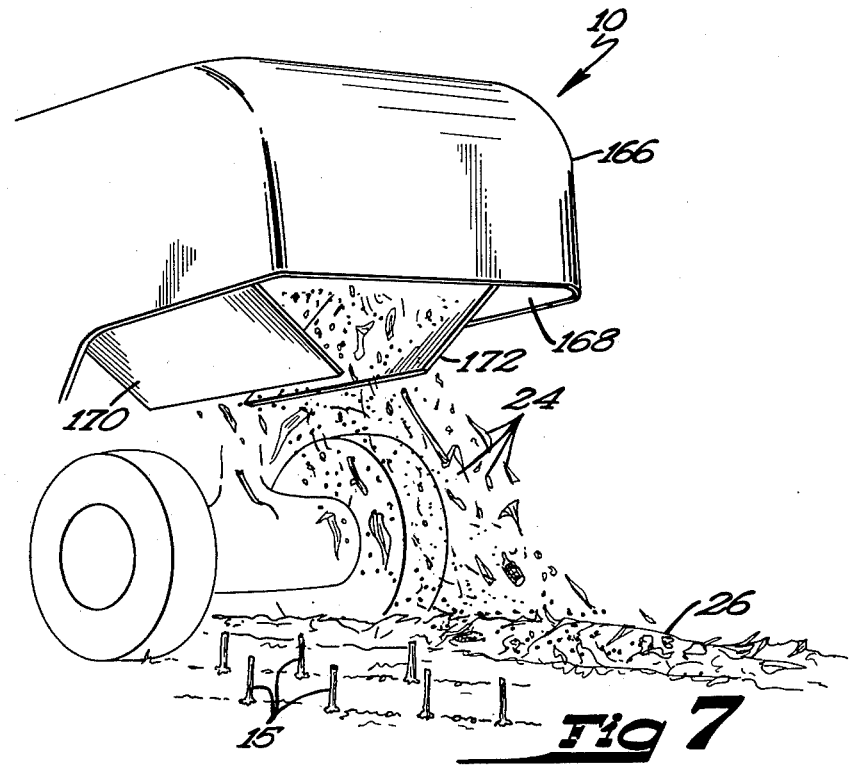
FIG. 7 is a rear perspective view of a corn harvesting implement showing its discharge aperture and the depositing of corn plant residue on a windrow in accordance with the invention.

Referring now to FIG. 7, the corn harvesting implement 10 at its rearward end 166 has a discharge aperture 168 from which the corn plant residue 24 is dropped downwardly. The sides of the discharge aperture 168 are provided with inwardly, downwardly, converging deflector plates 170 and 172 positioned in line with gap 28 as the implement moves along its path and on both lateral sides of the windrow 26 to receive and deflect the corn plant residue 24 therealong and downwardly onto the windrow 26. Accordingly, the plates 170 and 172 cooperate to guide the residue 24 and collectively comprise corn plant residue guidemeans positioned adjacent the discharge aperture 168 to receive and guide the residue from the discharge aperture and onto the windrow 26 to assure that the residue reaches the windrow and is not deflected laterally by surface winds.

While the residue guidemeans are shown herein as being a set of deflector plates, it will be appreciated by those skilled in the art that some implements discharge the residue at other locations than the rear of the implement and it should be understood that the term corn plant residue guidemeans, as used herein, includes any structural configuration attachable to the discharge aperture for conducting and directing the residue to the windrow 26.

Figure 8:
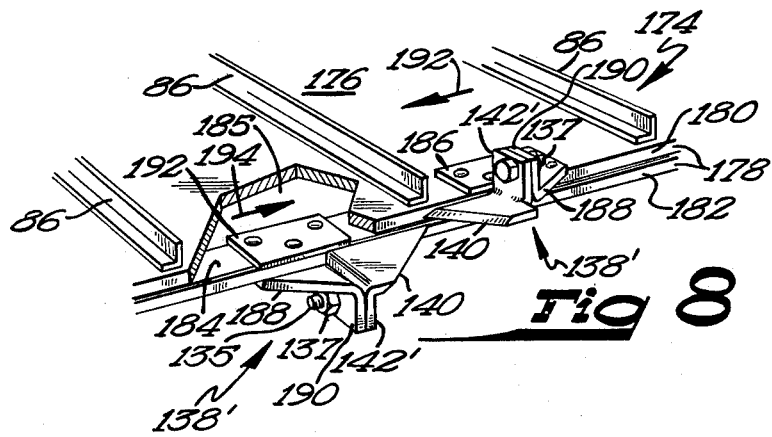
FIG. 8 is a front perspective drawing of an alternative embodiment of the invention wherein a moving conveyor belt has its leading edge provided with knives and cornstalk pushers.

Referring now to FIG. 8, an alternative embodiment of a cutting means usable with the corn harvesting apparatus is shown. In FIG. 8, a conveyor unit 174 which may be substituted for the units 20 or 22 has a conveyor belt 176 having upraised stalk engaging protrusions 86. The conveyor belt 176 differs from the already disclosed conveyor belt 62 in that the leading edge 178 of belt 176 directly confronts the cornstalks to be severed and gathered and the integral knife and pusher units 138 are fixed directly to the leading edge 178 of the conveyor belt 176 rather than to a moving chain as disclosed earlier. The conveyor unit 174 is constructed and arranged so that upper and lower parallel belt runs 180 and 182 are closely adjacent so that the knives 140, when moving horizontally with the belt will move closely adjacent one another as decribed in conjunction with the chain 124 in order to sever cornstalks therebetween. The conveyor belt 176 selected should be a relatively unstretchable belt and may be provided with internal fibers or steel cord to assure that it retains its original configuration with minimal stretching.

Preferably, the conveyor belt 176 has its forward or leading edge 178 provided with a stiffening and reinforcing medium such as a flexible steel band 184 on the inner surface 185 of the conveyor belt and extending completely about its circumference. A mounting bracket 186 is provided for the integral knife and pusher unit 138', the bracket 186 having a generally flat mounting portion 188 which is generally parallel to the surface of the conveyor belt 176 and extends forwardly outwardly therefrom with an upraised tab 190 to which the unit 138' is bolted. The bracket 186 is attached to the conveyor belt 176 by means of rivets passed through the plate 188, the belt 176, steel band 184 and through a bottom plate 192. As described in conjunction with the chain 124, the embodiment 174 utilizes a plurality of integral knife and pusher units 138' mounted at the leading edge of the conveyor belt 176 at regular intervals so that the moving conveyor belt defines upper and lower generally parallel belt runs along which the knives of the upper and lower runs converge and cooperate to cut cornstalks therebetween. The conveyor 174 is arranged such that the knives of the upper belt run 180 move in direction 192 toward the central gap 28 and the knives of the lower run move in opposite direction 194.

In operation, when it is desired to harvest a field of standing corn, the operator first mounts the conveyor units 20 and 22 to frame bars 103 of the corn harvesting implement 10 by means of the brackets 98 and 100 and the supporting chain 118. Each of the brackets 98 and 100 has a removable pin 101 which permits the linkage 102 to be secured to the harvesting implement 10, as best shown in FIGS. 1 and 10. The conveyor units are positioned beneath the corn heads 12a–12e and near the rearward ends of the snapping rollers 194. It is desirable that the moving knives 140 be positioned to cut the standing cornstalks 14 while the stalks are still engaged, gripped, and held upright by the snapping rollers but cutting of the stalks should occur just prior to the snapping rollers 194 actually releasing the stalk as best shown at stalk 206 in FIG. 10. After connecting and positioning of the conveyor units 20 and 22 on the implement 10, the hydraulic hoses 66 and 68 of each of the motors 64 are connected to the hydraulic system of the power source 13 of the corn harvesting implement 10 for operation and control from the cab 11.

The first and second spaced-apart deflector plates 170 and 172 are attached adjacent the discharge aperture 168 of the implement so as to receive and guide corn plant residue from the aperture 168 onto a windrow 26 formed beneath the implement and along its path.

In performing the harvesting operation, the implement 10 is propelled in a direction parallel to the rows of corn with the upright standing stalks moving along between and through the corn heads 12a–12e, as best shown in FIGS. 1 and 11. The standing stalks 14 are engaged by the snapping rollers 194 of the heads 12a–12e as the implement 10 moves along the rows, and the ears 16 are removed from the stalk and pass through the husking means 196 of implement 10 in a manner well-known to the art.

As the ears pass through the implement 10, the husking means 196 removes the husk from each ear and this corn plant residue resulting from husking is then discharged from the discharge aperture 168 at the rear of the implement, as will be further described hereafter. As is well-known to the art, the husked ear is retained by the implement in a separate bin and is not discharged with the residue.

At the start of the harvesting operation, the operator energizes the hydraulic motors 64 on the conveyor units 20 and 22 from the corn harvesting implement's own power source, and rotation of the motors 64 rotates rollers 50 which cause the conveyor belts 62 to begin moving with the rotating terminal rollers 46 and 50. The conveyor belt of the unit 20 moves in lateral direction 30 and the belt of unit 22 moves in lateral direction 32, as best shown in FIGS. 1 and 11, with the twin conveyor units moving stalks on the belts toward a central cornstalk discharge location located in the gap 28 between the adjacent conveyor units. If desired, the speed of the hydraulic motor 64 may be varied by the operator in a manner well known to the art to produce an optimum conveyor belt speed appropriate to the harvesting task.

As the shafts 54 and 56 rotate in response to rotation of the hydraulic motor 64, the attached sprockets 120 and 122 turn about their axes 121 and 123, respectively, in the counter clockwise directions 198 for the conveyor unit 20. The sprockets 120 and 122 of the conveyor unit 22 would, of course, rotate in a clockwise direction. The sprocket rotation of unit 20 causes the immeshed endless drive chain 124 to rotate with the sprockets and accordingly, the upper and lower chain runs 148 and 150, respectively, move in directions 156 and 158, respectively and are kept closely spaced and generally parallel to one another between the plate 144 and parallel flange 164. Idler wheels 146 guide the chain along the lower run 150.

As the endless chain 124 rotates on the sprockets, the plurality of integral knife and pusher units 138 of the parallel upper and lower chain runs converge toward one another, as best shown in FIG. 4. The cornstalks 14 which encounter the moving knife blades 140 of the units 138 are still engaged and supported from above by the snapping rollers 194 as shown in FIG. 10 and thus retained in a reasonably rigid, upright condition during severing.

As the units 138 converge (FIG. 4) in response to chain movement, the sharpened blades 140 sever the cornstalk at approximately five or six inches above ground level so as to avoid most dirt and dust, and the knives 140a of the upper chain run 148 pass above the knives 140b of the lower chain run 150, severing the stalk and initially urging the cut cornstalk 152 in the direction 156 toward the gap 28.

Referring now to FIG. 5, the knife and pusher unit 138a of conveyor unit 20 moves in direction 156 and cooperates with the knife and pusher unit 138b moving in direction 158 to sever the stalk 152. Immediately after severence, the upright pusher 142 of unit 138a strikes the cornstalk 152 and moves it in the direction 156, the unit 138a receiving the stalk 152 in the enclosure 139 defined by surfaces 140a, 142 and links 130 of the chain to engage and push the cornstalk 152 along. Simultaneously, the pusher 142 of the unit 138b strikes the still enrooted stub 15 of the cornstalk and urges it in the direction 158 to thereby assure a positive severence of the stalk and to break any clinging fiberous material interconnecting the stalk 152 and stub 15.

As the chain 124 continues its motion about the sprockets, the knife and pusher unit 138a moves to position 200, still carrying the cornstalk in enclosure 139 to the new position 152b, and further movement of the chain urges the stalk further toward the gap 28. As the stalk 152 is moved laterally toward the gap 28 at the inner end of the conveyor, the implement 10 is moving forwardly in the direction 160, disengaging the stalk from the snapping rollers 194 and causing the stalk to drop rearwardly onto the conveyor units 20 and 22, as best shown at 206 in FIG. 11. Stalks landing on the conveyors 20 and 22 have an orientation by which the severed stalk end is adjacent the leading edge of the conveyor and extending toward the gap 28 while the upper end of the cornstalk is positioned adjacent the rear plate 36 of the conveyor units and extends toward the outer end plate 42. Accordingly, the cornstalks land on the conveyor units 20 and 22 in an orientation where they extend diagonally across the conveyor units thereby keeping most of the length of each stalk supported by the conveyor belt and minimizing loss of corn crop.

While the principle object of the conveyor units 20 and 22 is to collect and move the severed cornstalks 152, it will be appreciated by those skilled in the art that during the operation of the snapping rollers 194 and the picking of the ears from the cornstalks, substantial amounts of leaves, husks and the like can be cut or dislodged by the snapping rollers and drop downwardly. Under normal circumstances, such elements may be lost in the field. The conveyor units 20 and 22 below the snapping rollers intercept much of this otherwise lost corn leaves, husks, etc, and transport such elements along with the cornstalks to the cornstalk discharge location located at the gap 28.

The raised protrusions 86 on the conveyor belts 162 engage the cornstalks 152 and move the stalks along on the belt to deposit the stalks in the gap 28 between conveyor units 20 and 22 to create a windrow 26 of cornstalks extending behind and beneath the corn harvesting implement 10, along the path of the implement, as best shown in FIGS. 1 and 11.

The corn plant residue 24 which has been created as the result of the husking of the corn ears by husking means 196 within the harvesting implement 10 is discharged downwardly from the discharge aperture 168 at the rear of the implement and by means of the deflecting plates 170 and 172 is guided downward and deposited on the windrow 26. The falling residue 24 is thus supported on and becomes immeshed in the windrow of cornstalks, thereby preventing loss of the residue and providing a location raised from the groud and exposed to sun and air currents for gradual and complete curing of the residue and stalks.

Referring now to FIG. 9, the windrow 26 has an underlying matrix of cornstalks 152 which define a platform on which the corn plant residue 24 comprised of corn kernels 208, leaves 210, husks 212, and the like may be deposited for retention and curing.

If, during movement through the corn field by the implement 10, a rock 114 or other uneven ground condition is encountered (FIG. 6), the ramp 112 of the conveyor unt 20 or 22 strikes the obstruction 114 and swings the conveyor unit rearwardly upwardly from the rest position 108 to the displaced position 110 while the ramp slides smoothly over the rock or obstruction without damage to the conveyor unit or the cutting means.

It has been found that the described embodiments of the invention and their use of a windrow to receive and retain corn plant residue is particularly desirable when poor crop growing conditions result in corn with hard-to-harvest undersized ears as often occurs in drought-type conditions. These undersized ears such as ear 204 (FIG. 9) may be too small to be properly husked or even picked by the implement 10, but will, in any event, be either caught on the conveyor units with the severed stalk and windrowed, or be deposited on the windrow with the other residue.

Referring now to FIG. 8, the operation of the alternative cutting means is similar to the operation of the units 138 on the chain 124. Instead of the use of a chain and sprockets, the integral knife and pusher units 138' are attached directly to the conveyor belt 176 and move with the belt instead of on a chain. The converging units 138' cut an upright standing cornstalk therebetween, just as was describedjin conjunction with the units 138 and upright pushers 142' strike the stalk and move it laterally just as was described in conjunction with FIG. 5. Aside from the fact that the integral knife and pusher units are attached to the conveyor 176, the operation of the units 138' is substantially identical to the units 138 and will not be described further.

Accordingly, the disclosure presents a new corn harvesting apparatus by which standing cornstalks may be harvested, a windrow created, and the corn plant residue from husking deposited on the windrow for curing and later collection. The use of the described apparatus results in a new method of harvesting corn wherein the ears are removed or picked from the stalk in a manner well known to the art, the stalk is then retained by the snapping rollers of a conventional harvesting head or picking means while the stalk is severed above ground level and below the snapping rollers by the decribed system of moving knives. The severed stalks are then struck by moving pushers and moved laterally toward the cornstalk discharge location as the stalks drop on a conveyor unit which transports them to the gap 28 where windrowing of the stalks occurs. After thus creating a windrow as described, the corn plant residue resulting from husking is deposited on the windrow for curing and later collection.

While the shown corn harvesting apparatus is adapted for use with a corn harvesting implement capable of servicing four rows of corn simultaneously, it should be understood that the unit can be used with oarger or smaller harvesting implements so as to service a greater or lesser number of rows of standing corn. In the event a larger number of rows is to be harvested, the conveyor units 20 and 22 would be of a greater length so as to lie rearwardly of the additional rows of corn to be harvested in order to cut and windrow all the cornstalks.

It will thus be appreciated that the present invention permits the simultaneous harvesting of both ears and stalks while recovering substantially all of the corn plant residue created by husking. The creation of the windrow and depositing of the residue on the windrow permits the stalks and residue to be left in the field in a natural storage position highly favorable to curing and to be subsequently picked up by the operator after curing has been completed. By permitting the curing to occur in the field by means of normal sun and wind conditions, the use of grain dryers can be substantially reduced and energy conserved.

While the preferred embodiments of the present invention have been described, it should be understood that various changes, adaptations and modifications may be made therein without departing from the spirit of the invention and the scope of the appended claims.

What is claimed is:

1. A corn harvesting apparatus usable for harvesting standing cornstalks rooted in the ground and having attached ears of corn while saving most corn plant residue resulting from husking of the ears so as to reduce crop loss comprising:

a corn harvesting implement having a power source and corn harvesting heads on the implement for engaging the standing cornstalks, removing the ears from the stalks and husking the ears, and having a corn plant residue discharge aperture for discharge of corn plant residue resulting from husking;

cornstalk cutting means energized by said power source and operatively positioned below said corn harvesting heads and above the ground and cooperating with said harvesting heads to sever standing cornstalks while the stalks are retained in an upright position by said harvesting heads; and cornstalk windrow defining means operatively mounted below said harvesting heads and rearwardly of said cornstalk cutting means to collect severed stalks as they leave said harvesting heads and to direct the stalks laterally relative to said implement to a predetermined stalk discharge location, said discharge location positioned forwardly of and lined up with said corn plant residue discharge aperture so as to define a windrow of such corn stalks along the path of the implement and with the windrow positioned beneath said discharge aperture so that corn plant residue from said implement drops downwardly from said aperture onto the windrow and is supported on and retained by the windrow for curing.

2. The corn harvesting apparatus of claim 1 and further including corn plant residue guide means attached to said implement adjacent said discharge aperture to receive and guide the residue from said aperture downwardly toward the windrow so as to prevent the residue from being diverted from the windrow by wind.

3. The corn harvesting apparatus of claim 2 wherein said corn plant residue guide means includes first and second spaced-apart deflector plates fixed to said implement adjacent said discharge aperture to shelter said aperture from wind.

4. The corn harvesting apparatus of claim 1 wherein said cornstalk windrow defining means includes first and second conveyor units positioned below said corn harvesting heads, energized by said power source and extending laterally outwardly from said implement transverse to the path of travel of said implement and spaced apart from one another by a central gap, each said conveyor unit constructed and arranged to move severed cornstalks toward said central gap to thereby deposit severed cornstalks in said central gap to define the windrow.

5. The corn harvesting apparatus of claim 4 wherein each of said first and second conveyor units includes an endless conveyor belt having a plurality of spaced-apart, stalk-engaging protrusions thereon to catch and engage the severed cornstalks falling on said conveyor belt.

6. The corn harvesting apparatus of claim 4 wherein said first and second conveyor units are pivotally connected to one another for swinging movement about a horizontal axis extending in the direction of said path.

7. The corn harvesting apparatus of claim 1 wherein said cutting means includes an endless chain and a plurality of forwardly extending knives fixed to said chain for movement with said chain, said chain being mounted for movement in a generally upright plane and having closely spaced upper and lower chain runs moving generally parallel to one another so that knives on said upper chain run cooperate with knives on said lower chain run to laterally converge and sever cornstalks therebetween, and wherein said knives on said upper chain run move toward said predetermined stalk discharge location so as to urge severed stalks toward said discharge location.

8. The corn harvesting apparatus of claim 7 wherein said cutting means includes a plurality of cornstalk pushers movably mounted relative to said implement to travel with said knives so as to strike and push the severed stalks toward said predetermined stalk discharge location.

9. The corn harvesting apparatus of claim 9 wherein each said knife adjoins and is integral with a said cornstalk pusher with each said knife being generally horizontally oriented with an integral, generally upright pusher extending therefrom and each said integral knife and pusher having an L-shaped cross section with the base of said L defining said knife and the vertical leg of said L defining said pusher so that stalks severed by said knife may be confined between said knife and said pusher and thereby moved toward said predetermined stalk discharge location.

10. The corn harvesting apparatus of claim 1 wherein said cornstalk cutting means includes a plurality of integral cornstalk severing and stalk-moving units, and wherein each of said integral stalk-receiving and stalk-moving units is L-shaped in cross section with the horizontal base of said L defining a stalk-severing knife and the vertical leg of said L defining a stalk-moving device so that stalks severed by said knife may be confined between said knife and said stalk-moving device and thereby moved toward said predetermined stalk-discharge location.

11. The corn harvesting apparatus of claim 10 wherein said stalk cutting means includes an endless chain operatively mounted for movement in a generally upright plane and further includes a plurality of brackets fixed to said chain at spaced-apart intervals therealong, a said stalk severing and stalk moving unit being attached to and carried by each said bracket.

12. The corn-harvesting apparatus of claim 1 wherein:

said cornstalk windrow defining means includes a conveyor unit energized by said power source and having a frame and first and second terminal conveyor rollers supported on first and second shafts, respectively, with said first and second shafts being rotatably mounted to said frame, said conveyor unit further including an endless conveyor belt mounted on said first and second rollers for movement therewith;

said cutting means includes first and second sprockets fixed to said first and second shafts, respectively, and positioned forwardly of said conveyor belt;

said cutting means further including an endless chain mounted therewith and having upper and lower generally parallel chain runs with said chains runs being closely spaced from one another; and said cutting means further including a plurality of forwardly extending knives fixed relative to said chain for movement therewith and spaced therealong with said knives of said upper chain run cooperating with knives of said lower chain run to engage and sever cornstalks therebetween.

13. The corn harvesting apparatus of claim 12 wherein said cutting means further includes a plurality of cornstalk pushers fixed relative to said chain and positioned between adjacent knives for movement with said chain, said pushers on said upper chain run striking the cornstalks and moving the stalks in a first lateral direction generally parallel to the chain defining said upper chain run while said pushers on said lower chain run strike the yet enrooted cornstalk and push such enrooted stalk in a second direction opposite to said first direction to insure clean severing of said stalks.

14. The corn harvesting apparatus of claim 1 wherein said collecting means includes a conveyor unit having an endless conveyor belt with a leading edge confronting the cornstalks and said cutting means includes a plurality of forwardly extending, spaced-apart knives mounted along said leading edge of said conveyor belt and fixed to said belt for movement with said conveyor belt.

15. The corn harvesting apparatus of claim 14 wherein said conveyor belt has upper and lower generally parallel belt runs and said knives are constructed and arranged so that said knives on said upper belt run cooperate with said knives on said lower belt run to converge upon and sever cornstalks therebetween.

16. The corn harvesting apparatus of claim 14 wherein said cutting means includes a plurality of cornstalk pushers fixed to said belt and extending forwardly and outwardly therefrom to engage and strike upright cornstalks and move such stalks, a said pusher being positioned between each pair of adjacent knives along said conveyor belt and being fixed relative to said conveyor belt to move therewith.

17. The corn harvesting apparatus of claim 1 wherein said cutting means includes a plurality of stalk-severing knives and a plurality of stalk-engaging pushers to cut said stalks and to urge said stalks toward said stalk discharge location.

18. A corn harvesting apparatus usable with a corn harvesting implement movable along a path and having corn ear picking means to strip ears from standing cornstalks and husking means and having a discharge orifice for the discharge of corn plant residue obtained from husking of the ears comprising:

cornstalk windrow defining means including a conveyor unit having an endless conveyor belt, said unit being attachable to the implement below the picking means to receive and move severed cornstalks to a predetermined stalk discharge location at an end of said conveyor unit so as to define a windrow of severed cornstalks along the path;

means for severing upright cornstalks and urging the upright severed stalks in a direction transverse to the path to cause the severed stalks to drop onto the conveyor belt surface in an orientation transverse to the path of the implement; and guide means attachable to the implement adjacent the discharge orifice to guide and direct corn material residue dropped from the orifice downwardly onto the windrow so as to deposit the corn material residue on the windrow for curing.

19. A corn harvesting apparatus movable along a path for harvesting standing cornstalks enrooted in the ground and having attached ears while saving most corn plant residue resulting from husking of the ears so as to reduce crop loss and usable with a corn harvesting implement having a power source and corn harvesting heads on the implement for gripping of the cornstalks, the implement having means for picking the ears from the cornstalks and means for husking the ears and having a discharge aperture for discharge of corn plant residue resulting from husking, comprising:

cornstalk cutting means energizable from the power source and attachable to the implement below the heads and above the ground to sever standing stalks while the stalks pass through the harvesting heads; and cornstalk windrow defining means energizable by the power source and attachable to the implement and located rearwardly of said cornstalk cutting means to receive severed stalks and to move the stalks laterally relative to the implement and to deposit the stalks along the path of the implement so as to define a windrow of such stalks along the path of the implement and beneath the discharge aperture so that corn plant residue from the aperture drops downwardly onto the windrow and is supported on the windrow for curing.

20. A method of harvesting standing cornstalks with attached ears so as to save most corn plant residue resulting from husking of the ears by a corn harvesting implement moving along a path and having corn harvesting heads and ear husking means and having a discharge aperture for discharge of the corn plant residue comprising the steps of:

cutting the cornstalks above ground level and below the harvesting heads;

collecting the severed cornstalks and arranging them in a windrow along the path of the implement;

discharging the corn plant residue onto the already formed windrow to keep the corn plant residue spaced from the ground and immeshed in and supported on the windrow for curing.

21. The method of harvesting corn of claim 20 and further including guiding the discharged corn plant residue from the discharge aperture of the implement to the windrow.

22. A method of harvesting standing cornstalks rooted in the ground and having attached ears of corn comprising:

picking the ears from the standing stalks;

cutting the cornstalks adjacent ground level;

collecting the severed cornstalks;

arranging the cornstalks in a windrow;

husking the ears of corn and separating the husked ear from the corn plant residue resulting from husking; and discharging the corn plant residue onto the already formed windrow to keep the corn plant residue spaced from the ground, immeshed in and supported on the windrow for curing.

23. The method of harvesting standing corn of claim 22 and further including striking the severed end of each cornstalk subsequent to cutting of the cornstalk so as to move the cornstalk laterally relative to the path of the implement.

24. A corn harvesting apparatus movable along a path and usable for harvesting standing cornstalks rooted in the ground and having attached ears of corn while saving most corn plant residue resulting from husking of the ears so as to reduce crop loss comprising:

a corn harvesting implement including a power source and corn picking means on said implement for engaging the standing cornstalks, removing the ears from the stalks and husking the ears, and having a discharge aperture for separate discharge of the corn plant residue exterior to the implement;

cornstalk cutting means energized by said power source and operatively positioned below said corn picking means and above the ground to sever standing cornstalks while the stalks are engaged by said picking means; and cornstalk windrow defining means carried by said implement and positioned rearwardly of said cornstalk cutting means to receive and collect severed stalks as they leave said harvesting heads and to combine the severed stalks into a windrow along the path of the apparatus with the windrow being positioned beneath said discharge aperture so that corn plant residue from said implement drops downwardly from said aperture onto the windrow and is supported on and retained by the windrow for curing.

25. A corn harvesting apparatus movable along a path and usable for harvesting standing cornstalks rooted in the ground and having attached ears of corn and usable with a corn harvesting implement having a power source and corn harvesting heads on the implement for engaging the standing cornstalks, removing the ears from the stalks and husking the ears, and having a discharge aperture for discharge of corn plant residue resulting from husking in order to save most corn plant residue so as to reduce crop loss, comprising:

cornstalk cutting means energizable by the power source and operatively positionable below the corn harvesting heads and above the ground to sever standing cornstalks as the stalks are engaged by the harvesting heads; and cornstalk windrow defining means operatively mountable to the implement below the arvesting heads and rearwardly of said cornstalk cutting means to collect severed stalks as such stalks leave the harvesting heads and to direct the stalks laterally relative to the implement to define a windrow of such stalks along the path of the implement with the windrow being positioned adjacent the implement so that corn plant residue from the implement may be deposited onto the windrow and is supported on and retained by the windrow for curing.

* * * * *

UNITED STATES PATENT AND TRADEMARK OFFICE
CERTIFICATE OF CORRECTION

PATENT NO.  : 4,182,098
DATED       : January 8, 1980
INVENTOR(S) : Kenneth J. Kass It is certified that error appears in the above—identified patent and that said Letters Patent are hereby corrected as shown below:

Col. 8, Line 8  - Delete "energizethe" and insert --energized by the--.

Col. 11, Line 34 - Delete "groud" and insert --ground--.

Col. 12, Line 1  - Delete "describedjin" and insert --described in--.

Col. 14, Line 5  - Delete "claim 9" and insert --claim 8--.

Col. 14, Line 19 - Delete "stalk-receiving" and insert --stalk-severing--.

Col. 14, Line 49 - After "mounted" insert --to said first and second sprockets for movement--.

Col. 18, Line 7  - Delete "arvesting" and insert --harvesting--.

Signed and Sealed this

Eighth Day of July 1980

[SEAL]

Attest:

SIDNEY A. DIAMOND

*Attesting Officer*   *Commissioner of Patents and Trademarks*